United States Patent

[11] 3,558,869

| [72] | Inventor | Robert E. Levin |
| | | Hamilton, Mass. |
| [21] | Appl. No. | 646,910 |
| [22] | Filed | June 19, 1967 |
| [45] | Patented | Jan. 26, 1971 |
| [73] | Assignee | Sylvania Electric Products Inc. |
| | | a corporation of New York |

[54] DRIVING LIGHT
2 Claims, 7 Drawing Figs.

[52] U.S. Cl. .................................................. 240/7.1,
240/41.3, 240/41.37, 240/46.31, 240/46.39,
240/46.43, 240/46.51, 240/78
[51] Int. Cl. .................................................. B60g 1/00,
B60g 3/00
[50] Field of Search .................................................. 240/7.1,
46.39, 46.43, 46.51, 41.3, 41.37, 46.31, 78LD-7;
355/54

[56] References Cited
UNITED STATES PATENTS

| 1,654,666 | 1/1928 | Ross | 240/46.39X |
| 1,928,539 | 9/1933 | Labastroy | 240/41.3 |
| 1,280,953 | 10/1918 | Bone | 240/46.31 |

Primary Examiner—John M. Horan
Assistant Examiner—Richard A. Wintercorn
Attorney—Laurence Burns ABSTRACT: A driving light having a sharp beam cutoff suitable for automobiles and the like, a multiple array of apertures being used with a multiple-zone lens, where each zone of the lens is associated with an aperture, and each lens-aperture combination has an associated element in the condensing system. A condensing system consisting of a series of elliptical reflectors. Each reflector takes light from a source at one focus and reflects it to a second focus which will be at the rear focus of the lens of a lens-aperture combination.

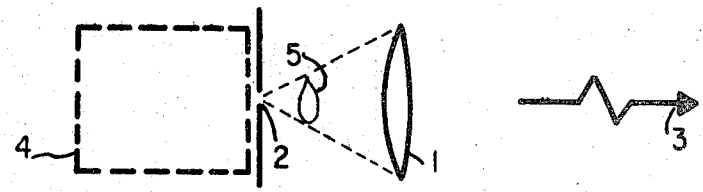
FIG. I
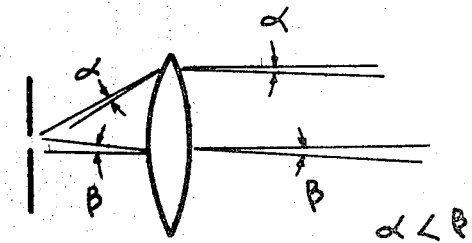
FIG. 2
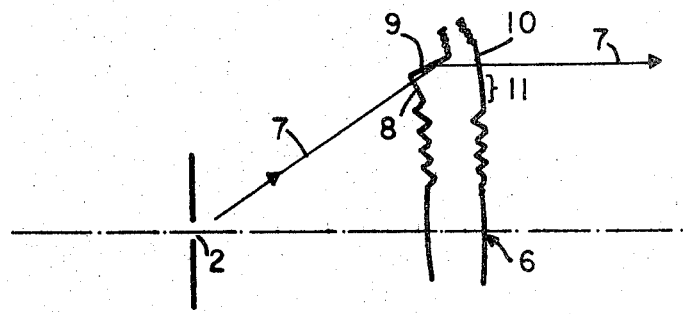
FIG. 3
ROBERT E. LEVIN
INVENTOR
BY Lawrence Burns,
ATTORNEY

1

DRIVING LIGHT

BACKGROUND OF THE INVENTION

1. Field of Invention

The invention relates to lighting equipment, particularly to driving light for automobiles and the like, where a sharp cutoff of the beam is desired.

2. Summary of the Prior Art

A sharp cutoff driving light can be made in the form of a projection system whereby an aperture, or stop, is imaged at infinity or at a great distance. The mechanism of operation is well-known; the objective, or projection, lens images the aperture at infinity. A source and condensing system illuminates the aperture. Such a condensing system may be of any form, reflective or refractive, providing it optically fills the solid angle seen by the lens. The maximum attainable intensity of this system is proportional to the source luminance the attenuation of the various optical elements, and the cross-sectional projected area of the objective lens. Thus for a given form of system and a specified source type, a large diameter objective lens is required to increase the intensity which can be produced.

When the luminaire is to be of the sealed-beam form, a short overall axial length is desired for mechanical reasons. This means that the objective lens must be fast. As a consequence:

a. The lens must be thick at the center compared to the edges.

b. Inherent abberrations exist since off-axis zones of the lens see a foreshortened aperture, and the aperture-lens distance increased. These factors decrease the angle subtended by the aperture as the distance of the lens zone increases from the axis.

c. In sealed-beam luminaires, the lens is formed by molding. Excessively thick sections are difficult to anneal, and contraction on cooling makes it impossible to maintain both surfaces of thick lenses.

d. The stigmatic property primarily determines the intensity distribution within the beam, and the designer has little or no control of this factor.

e. Fast single element lenses of the stigmatic type are corrected for spherical aberration, but the other monochromatic aberrations and the chromatic aberrations remain. Varying the thickness and "bending" the lens can magnify these aberrations to some extent, but they cannot be eliminated or even simultaneously reduced to desired values.

f. Rays near the edge of the a fast lens are at large angles with the normal to the glass surface. This significantly reduces the transmittance of these regions. Further, the images created by these edge regions are much more sensitive to object misalignment as is obvious from Snell's Law. This demands strict tolerance limits on the system.

One solution for thinning the lens consists of making it of dioptric form, that is, stepped. In a molded element, reentrant angles are not possible. The steps reduce the percent fill of the lens and introduce stray light outside of the desired beam. A dioptric lens is considered poor for imaging systems. The outer zones may be of catadioptric form.

In this case, rays enter the glass at one surface, undergo total internal reflection at a second surface, and emerge at a third surface. The desired control may be proportioned in any manner between the three surfaces, but a section of the lens in line with the entrance zone can never be filled; this reduces the maximum intensity; this zone is even wider than for the dioptric form. Further, the positioning tolerances of the dioptric and catadioptric elements differ. If the lens axis deviates by an angle from the optic axis, the emergent beams of the dioptric sections deviate by approximately half the angle while the emergent beams from the catadioptric sections deviate by approximately twice the angle. This phenomena is useful of itself, only when the angular tolerances are to be maintained much smaller than the critical angular beam dimensions.

2

BRIEF SUMMARY OF INVENTION

My invention eliminates the problems discussed in the previous sections. A multiple array of apertures is used whereby each aperture is imaged by its own individual slow zone preferably of a single pressed piece of glass. Used with a reflective type of condensing system, one aperture can be centered on the optic axis of the system and imaged by a lens zone. A second aperture can be imaged by another lens zone. Additional apertures will generally be used. A source of luminous flux irradiates the apertures. The condensing system for the first aperture is an ellipsoidal surface with one foci in the proximity of the source and the other in the proximity of the aperture. The condensing system for the second aperture is an ellipsoidal surface with a focii in the proximity of the source and one in the proximity of the aperture. This second ellipsoid is an off-axis section. These reflective elements are limited in extent by the bounding rays for each lens zone and aperture combination. The total number of apertures may be any number; but as the number of apertures is increased, the unfilled sections of the lens will increase and tolerances be reduced.

My invention eliminates the previously mentioned problems of the single lens-aperture system:

a. Each individual lens zone is slow, allowing it to be thin;

b. The angle subtended by the aperture is relatively constant over its own lens zone;

c. The thin elements allow molding;

d. The image of each aperture may be overlapped or not, permitting flexibility in the intensity distribution;

e. The aberrations other than spheric are reduced since lens is slow; and f. Rays at the edge of each slow lens zone are closer to the normal than in a fast version, thereby reducing tolerance limits and increasing transmittance.

Succinctly, the invention described herein is a multiple array of apertures with a multiple-zone lens where each zone of the lens is associated with an aperture. Further each such combination of lens and apertures has an associated element in the condensing system, for example, a reflector.

BRIEF DESCRIPTION OF DRAWINGS

Other objects, features and advantages of the invention will be apparent from the following specification, taken in connection with the accompanying drawing, in which:

FIG. 1 is a diagram showing a prior form of optical system for driving lights;

FIG. 2 is a meridian section of the same system, showing how the angle subtended by the aperture decreases with the distance of the lens zone from the axis;

FIG. 3 shows a system with dioptric and catadioptric lens elements;

BRIEF DESCRIPTION OF SPECIFIC EMBODIMENTS

Figure 4:
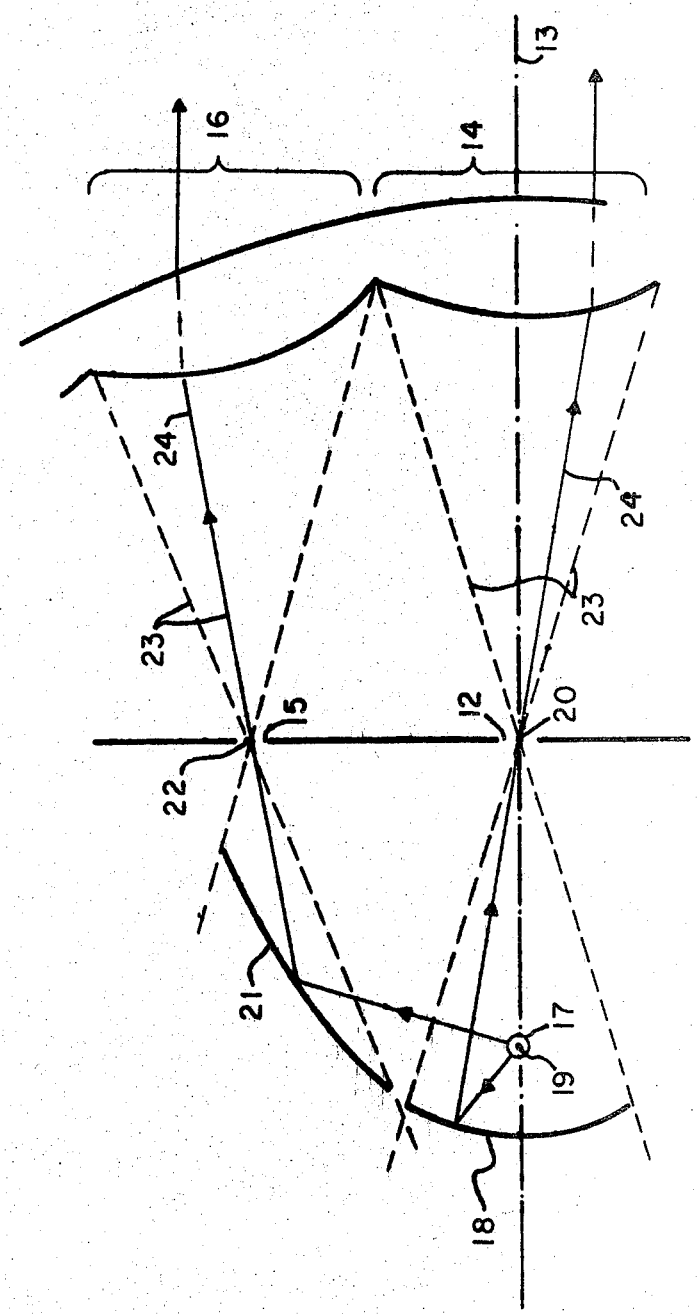
FIG. 4 is a diagrammatic section in the meridian plane of an optical system according to the invention.

A sharp cutoff driving light can be made in the form of a projection system whereby an aperture, or stop, is imaged at infinity (or at a great distance). The basic elements of such a system are illustrated in FIG. 1, and the mechanism of operation is well-known. The objective, or projection, lens 1 images the aperture 2 at infinity 3. A source and condensing system 4 illuminates the aperture 2. This condensing system may be of any form, reflective or refractive, providing it optically fills the solid angle 5 seen by the lens 1. Specifically note that the maximum attainable intensity of this system is proportional to: (a) the source luminance, (b) the attenuation of the various optical elements, and (c) the cross-sectional projected area of the objective lens. Thus for a given form of system and a specified source type, a large diameter objective lens is required to increase the producable intensity.

This system has the many disadvantages enumerated in a prior part of the present specification, perhaps the main disadvantage being that the lens must be thick at its center as compared to its edges.

One solution for thinning the lens consists of making it of dioptric form (stepped). In a molded element, reentrant angles are not possible. The steps reduce the percent fill of the lens and introduce stray light outside of the desired beam. A dioptric lens is considered poor for imaging systems. The outer zones may be of catadioptric form. Catadioptric elements have two additional faults. In FIG. 3 the aperture is imaged normally by the center zone 6. Rays such as 7 enter the glass at surface 8, undergo total internal reflection at surface 9, and emerge at surface 10. The desired control may be proportioned in any manner between surfaces 8, 9 and 10. A section of the lens 11 in line with entrance zone 8 can never be effectively filled; this reduces the maximum intensity; this zone is even wider than for the dioptric form.

Further, the positioning tolerances of the dioptric and catadioptric elements differ. If the lens axis is deviated by an angle δ from the optic axis, the emergent beams of the dioptric sections deviated by approximately one-half δ while the emergent beams from the catadioptric sections deviate by approximately two δ. This phenomena is of itself useful only when the angular tolerances are to be maintained much smaller than the critical angular beam dimensions.

This invention eliminates all of the problems discussed in the previous sections. A multiple array of apertures is used whereby each aperture is imaged by its own individual slow zone of the single pressed piece of glass. FIG. 4 shows a meridian plane section illustrating two of the parallel systems of the luminaire with a reflective type of condensing system. One aperture 12 is illustrated for convenience as centered on the optic axis 1 of the system. This is imaged by the lens area 14. A second aperture 15 is imaged by another lens area 16. These are only two representative apertures of the multiple 3-dimensional array. A source of luminous flux 17 irradiates the apertures. The condensing system for aperture 12 is an ellipsoidal surface 18 with focii 19, 20 in the proximity of the source 17 and in the proximity of aperture 12. The condensing system for aperture 15 is an ellipsoidal surface 21 with focii 17, 22 in the proximity of the source 17 and in the proximity of aperture 15. This ellipsoid 21 is an off-axis section. These reflective elements are limited in extent by the bounding rays 23 for each lens zone and aperture combination. Typical rays 24 for the two apertures are illustrated. The total number of apertures may be any number; but as the number of apertures increase, the unfilled sections of the lens increases and tolerances are reduced.

Figure 5:
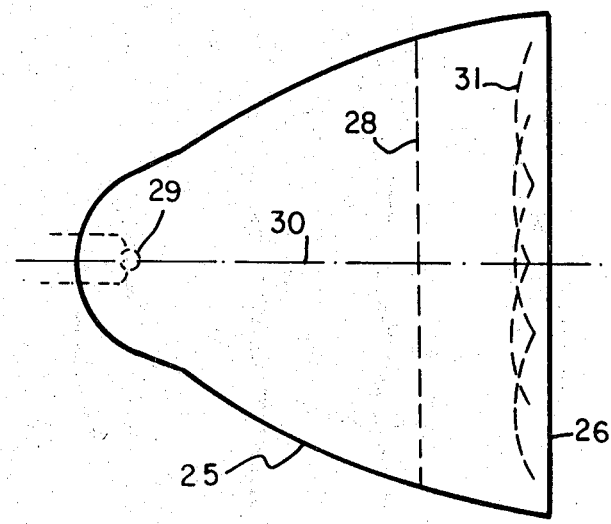
FIG. 5 is a diagrammatic side elevational view of a device according to the invention.
Figure 5A:
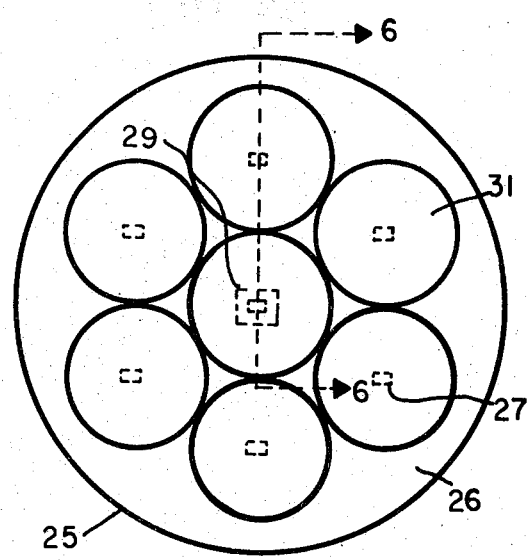
FIG. 5a is a diagrammatic front elevational view of the same.
Figure 6:
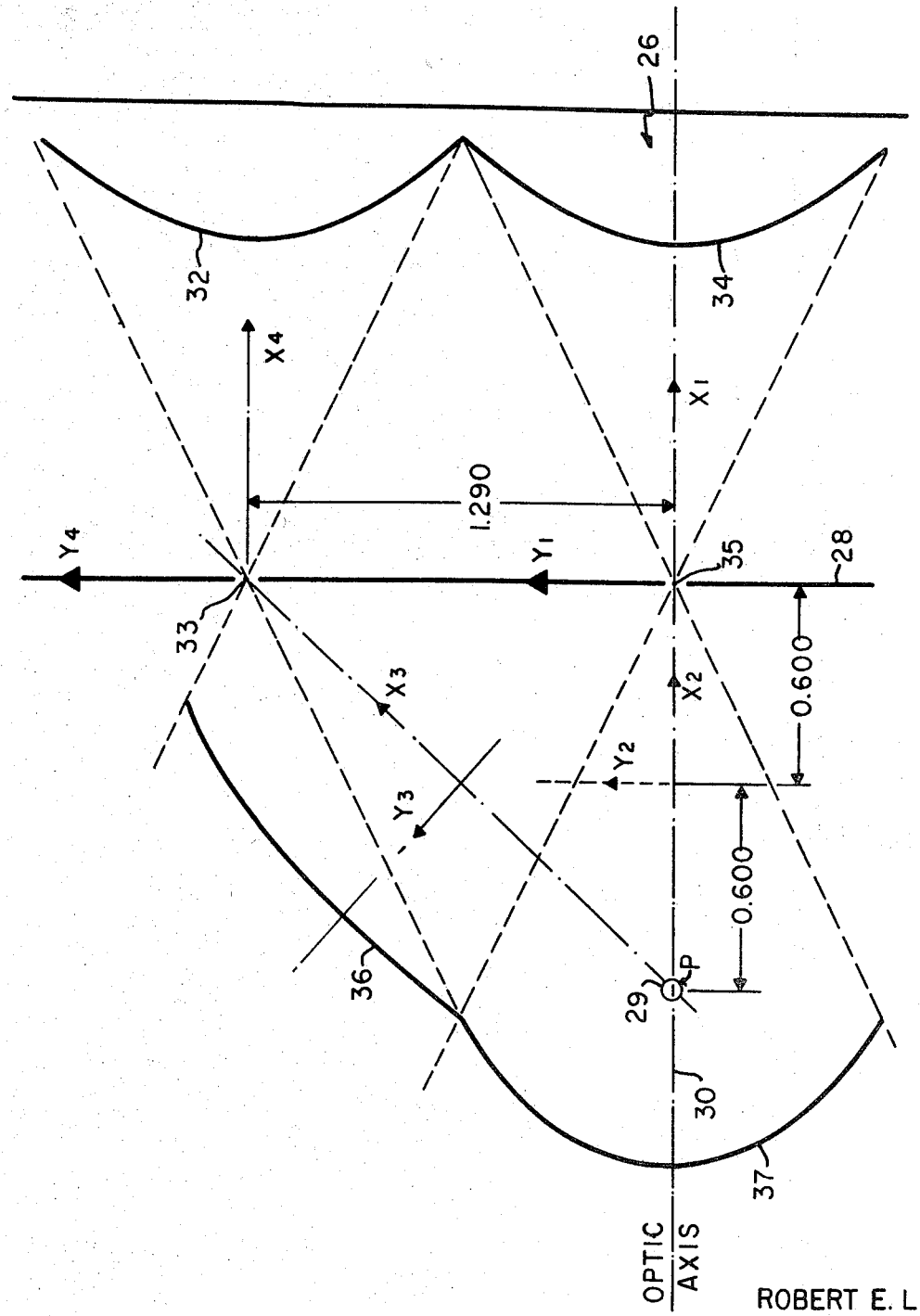
FIG. 6 is a diagrammatic partial view taken on the lines 6—6 of FIG. 5 in the meridian plane of the same device.

A particular embodiment of this invention is shown in FIG. 5. The seal beam lamp 25 has a front lens 26 of refractive index 1,500 with a flat outer surface. The apertures 27 are in a plane 28 behind the lens. The incandescent filament 29 is centered on the optic axis 30 of the entire lamp; this is also the axis of element symmetry. The individual lens zones 31 are on lines through the aperture centers and parallel to the optic axis. The specific elements are specifically defined in the partial meridian plane view of FIG. 6. The lens zone 32 is for aperture 33, and the lens zone 34 is for aperture 35. Zone 32 is a surface of revolution about axis $X_4$, and zone 34 is a surface of revolution about axis $X_1$. The ellipsoidal reflector 36 for aperture 33 is a surface of revolution about axis $X_3$. The ellipsoidal reflector 37 for aperture 35 is a surface of revolution about axis $X_2$ and $X_1$. The ellipsoid 36 has point P and the center of aperture 33 as focii. The ellipsoid 37 has point P and the center of aperture 35 as focii. Equations are given for meridian plane traces of all curves. The ellipsoid 36 extends out to the intersection with the surface $.496x_4 = \sqrt{y_4^2+z_4^2}$, and the ellipsoid 37 extends out to the intersection with the surface $.496X_1 = \sqrt{y_1^2+z_1^2}$. Here $(x, y, z)$ is a right-handed rectangular coordinate system. All dimensions are in inches. The incandescent source 29 is a helical coiled filament centered on point P. The apertures are 0.035 inch × 0.104 inch. The projected beam is rectangular in shape and subtends an angular zone of 2° × 6°. The other elements of the system not shown in FIG. 6 are identical to the shown elements and symmetrically located about the optic axis.

This particular embodiment is in no way restrictive on the invention disclosed herein. The following variations are included in this concept.

a. This technique holds for any system that must be short axially. It is not restricted to seal-beam systems.
b. Variations in the condensing system are possible. It may be a refractive system. A reflective system need not be formed of ellipsoids, but other similar surfaces will work. Refer to pending patent titled "Match Reflector Projection Light Source" for further discussion of reflective condensing systems designed to meet further restrictions. Any lens where each element is essentially stigmatic for its own aperture meets the conditions of this invention. Also the lens need not be formed of a single piece of glass.
c. Multiple sources may be used in place of a single source of luminous flux. A corresponding change in the condensing system can be accomplished by known techniques. By switching the sources independently, the beam pattern can be varied.
d. One or more of the stigmatic zones of the lens may be partially or completely replaced by spread lens elements. This would provide a low intensity zone in conjunction with the main high intensity pattern. For some automotive guidance purposes such a low intensity zone is desirable.
e. The lens may take any mechanical form that satisfied the defined optical properties. As an example, the front surface may be curved rather than flat. Corresponding changes in the rear surface will maintain the optical properties.
f. The use of this seal beam unit is not restricted to automotive applications.
g. The lens zone 31 need not be circular in outline.

I claim:

1. A driving light for automobiles and the like comprising at least one light source, a shelf having several apertures therein in front of said light source, a series of reflecting surfaces behind said light source to produce real images of said source in at least some of said apertures, and a light-transmissive piece having a series of lens-shaped zones, each said zone receiving light from one of said apertures, said reflecting surfaces being portions of ellipsoids.

2. A driving light for automobiles and the like comprising at least one light source, a shield having several apertures therein in front of said light source, a series of reflecting surfaces behind said light source to produce real images of said source in at least some of said apertures, and a light-transmissive piece having a series of lens-shaped zones, each said zone receiving light from one of said apertures, said reflecting surfaces being portions of ellipsoids at least one of the portions of ellipsoids being a portion off the axis of the ellipsoid.